(12) United States Patent
Shimizu et al.

(10) Patent No.: US 11,939,412 B2
(45) Date of Patent: Mar. 26, 2024

(54) CURABLE COMPOSITION, ANTIFOGGING COATING AGENT, AND CURED FILM

(71) Applicant: TOKYO OHKA KOGYO CO., LTD., Kanagawa (JP)

(72) Inventors: Hisato Shimizu, Kanagawa (JP); Takahiro Senzaki, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 52 days.

(21) Appl. No.: 17/707,120

(22) Filed: Mar. 29, 2022

(65) Prior Publication Data

US 2022/0325024 A1 Oct. 13, 2022

(30) Foreign Application Priority Data

Mar. 31, 2021 (JP) .................. 2021-059661

(51) Int. Cl.

| | | |
|---|---|---|
| *C08F 2/46* | (2006.01) | |
| *C08F 2/50* | (2006.01) | |
| *C08F 222/10* | (2006.01) | |
| *C08G 61/04* | (2006.01) | |
| *C08K 5/06* | (2006.01) | |
| *C08K 5/42* | (2006.01) | |
| *C09D 133/08* | (2006.01) | |
| *C09K 3/18* | (2006.01) | |

(52) U.S. Cl.
CPC ...... *C08F 222/103* (2020.02); *C08F 222/105* (2020.02); *C08K 5/06* (2013.01); *C08K 5/42* (2013.01); *C09D 133/08* (2013.01); *C09K 3/18* (2013.01)

(58) Field of Classification Search
CPC .... C08F 222/105; C08F 222/103; C08K 5/06; C08K 5/42; C09K 3/18; C09D 133/08
USPC ............... 522/83, 71, 1, 6, 189, 184; 520/1
See application file for complete search history.

(56) References Cited

U.S. PATENT DOCUMENTS

2017/0044393 A1\* 2/2017 Okazaki ................ B32B 27/302

FOREIGN PATENT DOCUMENTS

| JP | 55-69678 | | 5/1980 |
|---|---|---|---|
| JP | 2000239045 | \* | 9/2000 |

OTHER PUBLICATIONS

Yoneda et al, JP 2000-239045 Machine Translation, Sep. 5, 2000 (Year: 2000).\*

\* cited by examiner

*Primary Examiner* — Jessica Whiteley

(74) *Attorney, Agent, or Firm* — WENDEROTH, LIND & PONACK, L.L.P.

(57) ABSTRACT

Provided are a curable composition that provides a cured film excellent in antifogging properties, an antifogging coating agent containing the composition, and a cured film formed from a cured product of the composition. A curable composition according to an embodiment of the invention contains a (meth)acrylate compound (A), and a surfactant (B), wherein the component (A) contains a (meth)acrylate compound (A1) having an HLB value of 15.2 or more, and the content of the component (B) with respect to 100 parts by mass of the component (A) is 0.1 parts by mass or more and 20 parts by mass or less.

6 Claims, No Drawings

CURABLE COMPOSITION, ANTIFOGGING COATING AGENT, AND CURED FILM

This application is based on and claims the benefit of priority from Japanese Patent Application No. 2021-059661, filed on 31 Mar. 2021, the content of which is incorporated herein by reference.

BACKGROUND OF THE INVENTION

Field of the Invention

The present invention relates to a curable composition, an antifogging coating agent containing the composition, and a cured film formed from a cured product of the composition.

Related Art

Condensation of moisture may occur on the surface of an article in a humid place or the like. In particular, for transparent articles such as window glass and lenses, as well as reflective articles such as mirrors, if the progress of light is obstructed by the fogging caused by the condensation of moisture, a normal field of view cannot be provided to the user. Therefore, such articles preferably have a function to prevent the fogging.

In order to solve the problems mentioned above, antifogging compositions which are cured by actinic radiation such as ultraviolet rays and electron beams have been proposed in recent years. Specifically, for example, an antifogging agent has been proposed which contains a photocurable ethylenic unsaturated compound containing a hydrophilic group, a photocurable ethylenic unsaturated compound containing no hydrophilic group, and a photo-curing initiator (Patent Document 1).

Patent Document 1: Japanese Unexamined Patent Application, Publication No. S55-69678

SUMMARY OF THE INVENTION

The conventional antifogging compositions, however, fail to provide satisfactory antifogging properties, for example, in that the antifogging properties are not achieved under a high humidity environment.

The present invention has been made taking the above circumstances into consideration, with an object of providing a curable composition that provides a cured film excellent in antifogging properties, an antifogging coating agent containing the composition, and a cured film formed from a cured product of the composition.

The present inventors have conducted intensive research to solve the problems described above. As such, the present inventors have found that a curable composition containing a (meth)acrylate compound (A1) having an HLB value falling within a predetermined range, and a predetermined amount of a surfactant (B) solves the problem, thus completing the present invention. Specifically, the present invention provides the following.

A first aspect of the present invention relates to a curable composition containing a (meth)acrylate compound (A), and a surfactant (B), wherein the component (A) contains a (meth)acrylate compound (A1) having an HLB value of 15.2 or more, and the content of the component (B) with respect to 100 parts by mass of the component (A) is 0.1 parts by mass or more and 20 parts by mass or less.

A second aspect of the present invention relates to an antifogging coating agent containing the curable composition.

A third aspect of the present invention relates to a cured film formed from a cured product of the curable composition.

According to the present invention, it is possible to provide a curable composition that provides a cured film excellent in antifogging properties, an antifogging coating agent containing the composition, and a cured film formed from a cured product of the composition.

DETAILED DESCRIPTION OF THE INVENTION

<<Curable Composition>>

A curable composition according to an embodiment of the invention contains a (meth)acrylate compound (A), and a surfactant (B), wherein the component (A) contains a (meth)acrylate compound (A1) having an HLB value of 15.2 or more, and the content of the component (B) with respect to 100 parts by mass of the component (A) is 0.1 parts by mass or more and 20 parts by mass or less.

A cured film formed from a cured product of the curable composition according to the embodiment of the invention exhibits antifogging properties since the component (A1) has the HLB value of 15.2 or more and therefore a component derived from the component (A1) absorbs moisture concomitantly with the deposition of the moisture on the surface of the cured film. Above the limit of moisture absorption of the component derived from the component (A1), the deposition of water droplets usually occurs, and the surface of the cured film becomes opaque; in the cured film of the embodiment of the present invention, the component (B) dissolved in the absorbed moisture is eluted onto the surface of the cured film, leading to the formation of a water film with a low surface tension, whereby the antifogging properties are exhibited. Thus, the curable composition according to the embodiment of the invention can provide a cured film excellent in antifogging properties.

As used herein, the term "(meth)acrylate" refers to both acrylate and methacrylate, the term "(meth)acryl" refers to both acryl and methacryl, and the term "(meth)acryloyl" refers to acryloyl and methacryloyl. Further, as used herein, the term "polyfunctional (meth)acrylate compound" refers to a compound having two or more (meth)acryloyl groups in a single molecule.

Hereinafter, essential components and optional components contained in the curable composition will be described.

<Component (A)>

The curable composition according to the embodiment of the invention contains the (meth)acrylate compound (A), and the component (A) contains a (meth)acrylate compound (A1) having an HLB value of 15.2 or more. Thus, in a cured film formed from a cured product of the composition, the moisture adsorbed on the surface of the cured film is absorbed, leading to excellent antifogging properties.

The HLB value of the (meth)acrylate compound (A1) is preferably 15.5 or more, and more preferably 16.0 or more. The upper limit of the HLB value is not particularly limited.

As used herein, the HLB value of the (meth)acrylate compound (A1) refers to a value determined according to the following equation based on the Griffin method.

HLB value =20×(sum of formula weights of hydrophilic functional groups)/(molecular weight)

As used herein, a hydrophilic functional group refers to a sulfone group (—SO$_3$—), a phosphono group (—PO$_3$—), a carboxyl group (—COOH), an amide group (—CONH—), an imide group (—CON—), an aldehyde group (—CHO), a hydroxyl group (—OH), an amino group (—NH$_2$), an acetyl group (—COCH$_3$), an ethyleneamine group (—CH$_2$CH$_2$N—), an ethyleneoxy group (—CH$_2$CH$_2$O—), an alkali metal ion, an alkaline earth metal ion, an ammonium ion, a halide ion, and an acetate ion.

Examples of the (meth)acrylate compound (A1) include polyfunctional (meth)acrylate compounds having an alkyleneoxy group having 2 or more and 4 or less carbon atoms, specifically, polyfunctional (meth)acrylate compounds having an ethyleneoxy group.

As the (meth)acrylate compound (A1), a polyfunctional (meth)acrylate compound represented by the following formula (a1), and/or a bifunctional (meth)acrylate compound represented by the following formula (a2) are/is preferable, and a polyfunctional (meth)acrylate compound represented by the following formula (a1) is more preferable,

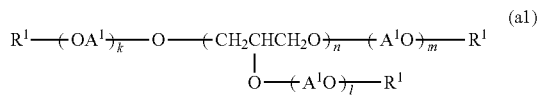
(a1)

wherein in the formula (a1), n is a number of 4 or more; A1 represents independently at each occurrence an alkylene group having 2 or more and 4 or less carbon atoms; k, l and m are a number of 0 or more, and the sum of k, l and m is 50 or more; and
R$^1$ represents independently at each occurrence a hydrogen atom or a (meth)acryloyl group, and at least three R$^1$ represent a (meth)acryloyl group, and

(a2)

wherein in the formula (a2), A$^2$ represents an alkylene group having 2 or more and 4 or less carbon atoms; p is a number of 10 or more; and
R$^2$ represents independently at each occurrence a (meth) acryloyl group.

In the formula (a1), n is a number of 4 or more, preferably a number of 4 or more and 10 or less, and more preferably a number of 4 or more and 6 or less. A$^1$ represents independently at each occurrence an alkylene group having 2 or more and 4 or less carbon atoms, and the alkylene group having 2 or more and 4 or less carbon atoms may be linear or branched. A$^1$ preferably represents an ethylene group. The symbols k, l and m are each independently a number of 0 or more, preferably a number of 1 or more and 40 or less, and more preferably a number of 1 or more and 30 or less. The sum of k, l and m is 50 or more, preferably 50 or more and 100 or less, and more preferably 55 or more and 80 or less. R$^1$ represents independently at each occurrence a hydrogen atom or a (meth)acryloyl group, and at least three R$^1$ represent a (meth)acryloyl group, preferably at least four R$^1$ represent a (meth)acryloyl group, and more preferably at least six R$^1$ represent a (meth)acryloyl group.

In the formula (a2), A$^2$ represents an alkylene group having 2 or more and 4 or less carbon atoms, and the alkylene group having 2 or more and 4 or less carbon atoms may be linear or branched. A$^2$ preferably represents an ethylene group. The symbol p is a number of 10 or more, preferably a number of 10 or more and 30 or less, and more preferably a number of 12 or more and 20 or less. R$^2$ represents independently at each occurrence a (meth)acryloyl group.

The content of the (meth)acrylate compound (A1) in 100% by mass of the component (A) is preferably 35% by mass or more and 99% by mass or less, more preferably 40% by mass or more and 90% by mass or less, and even more preferably 50% by mass or more and 80% by mass or less. When the content of the (meth)acrylate compound (A1) falls within the numerical range, favorable antifogging properties tend to be achieved.

It is preferable that the component (A) contains a polyfunctional (meth)acrylate compound (A2) other than the component (A1). This makes it easier to improve the curability of the cured film.

Examples of the polyfunctional (meth)acrylate compound (A2) include ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth) acrylate, trimethylolpropane tri(meth)acrylate, glycerin di(meth)acrylate, pentaerythritol tri(meth)acrylate, pentaerythritol tetra(meth)acrylate, dipentaerythritol penta(meth)acrylate, dipentaerythritol hexa(meth)acrylate, pentaerythritol di(meth)acrylate, pentaerythritol tri(meth) acrylate, pentaerythritol tetra(meth)acrylate, dipentaerythritol penta(meth)acrylate, dipentaerythritol hexa(meth)acrylate, ethylene glycol diglycidyl ether di(meth) acrylate, diethylene glycol diglycidyl ether di(meth)acrylate, phthalic acid diglycidyl ester di(meth)acrylate, glycerin tri (meth)acrylate, glycerin polyglycidyl ether poly(meth)acrylate, and the like.

The content of the polyfunctional (meth)acrylate compound (A2) in 100% by mass of the component (A) is preferably 1%. by mass or more and 65% by mass or less, more preferably 10% by mass or more and 60% by mass or less, and even more preferably 20% by mass or more and 50% by mass or less. When the content of the polyfunctional (meth)acrylate compound (A2) falls within the numerical range, it is easier to achieve both an improvement of the hardness of the cured film and the antifogging properties.

The content of the (meth)acrylate compound (A) is preferably 40% by mass or more, more preferably 60% by mass or more, and even more preferably 80% by mass or more based on the mass of the curable composition excluding the mass of a solvent (E) described later (the entire solid components). The content described above is preferably 99% by mass or less. When the content of the (meth)acrylate compound (A) falls within the numerical range, favorable antifogging properties tend to be achieved.

<Component (B)>

The curable composition according to the embodiment of the invention contains a surfactant (B), and the content of the component (B) with respect to 100 parts by mass of the component (A) is 0.1 parts by mass or more and 20 parts by mass or less. Thus, in the cured film formed from a cured product of the composition described above, above the limit of moisture absorption of the component derived from the component (A1), the component (B) dissolved in the absorbed moisture is eluted onto the surface of the cured film leading to the formation of a water film with a low surface tension, whereby excellent antifogging properties are exhibited.

As the surfactant (B), a water-soluble surfactant may be preferably used. The water-soluble surfactant is not particularly limited so long as it is soluble in water, but the water-soluble surfactant preferably has a solubility of 0.01% by mass or more. Any nonionic, cationic, anionic, or amphoteric surfactant can be used as the surfactant (B). The surfactant may be silicone-based. These surfactants may be used singly, or in a combination of two or more types thereof.

Examples of the nonionic surfactant include polyoxyalkylene primary alkyl ethers or polyoxyalkylene secondary alkyl ethers such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, polyoxyalkylene polystyryl phenyl ether, and the like. Examples of the cationic surfactant include oleylamine acetate, laurylpyridinium chloride, cetylpyridinium chloride, lauryltrimethylammonium chloride, stearyltrimethylammonium chloride, behenyltrimethylammonium chloride, didecyldimethylammonium chloride, didecyldimethylammonium bromide, and the like. Examples of the anionic surfactant include salts of coconut fatty acid, salts of sulfonated castor oil, lauryl sulfate salts, polyoxyalkylene allyl phenyl ether sulfate salts, alkylbenzenesulfonic acid, alkylbenzenesulfonate salts, alkyldiphenyl ether disulfonates, alkylnaphthalenesulfonates, dialkyl sulfosuccinate salts, isopropyl phosphate, polyoxyethylene alkyl ether phosphate salts, polyoxyethylene allyl phenyl ether phosphate salts, and the like. Examples of the amphoteric surfactant include coconut alkyldimethylamine oxides, fatty acid amidopropyldimethylamine oxides, alkylpolyaminoethylglycine hydrochlorides, amidobetaine-type surfactants, alanine-type surfactants, lauryliminodipropionic acid, and the like.

The content of the surfactant (B) with respect to 100 parts by mass of the component (A) is 0.1 parts by mass or more and 20 parts by mass or less, preferably 0.5 parts by mass or more and 15 parts by mass or less, and more preferably 1 part by mass or more and 10 parts by mass or less. When the content of the surfactant (B) falls within the numerical range, favorable antifogging properties tend to be achieved.

<Component (D)>

The curable composition according to the embodiment of the invention preferably contains an initiator (D). The initiator (D) is not particularly limited, and conventionally known photoinitiators and thermal polymerization initiators, etc. may be used; the photoinitiators are preferable in light of the ease of favorable curing of a polymerizable composition within a short period of time, and the like.

Examples of the photoinitiators include, 1-hydroxy-cyclohexylphenylketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl)ketone, 2-methyl-1-[4-(methylthio)phenyl]-2-morpholinoproban-1-one, 2-benzyl-2-dimethylamino-1-(4-morpholinophenyl)-butan-1-one, 1,2-octanedione,1-[4-(phenyithio)phenyl]-,2-(O-benzoyl oxime ester) (Irgacure OXE01), ethanone-1-[9-ethyl-6-(2-methylbenzoyl)-9H-carbozol-3-yl]-1-(O-acetyloxime) (Irgacure OXE02), 2,4,6-trimethylbenzoyldiphenylphosphineoxide (Omnirad TPO H), bis(2,4,6-trimethyl benzoyi) phenyl phosphine oxide (Omnirad 819), 4-benzoyl-4'-methyldimethylsulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-β-methoxyethylacetal, benzyldimethylketal, 1-phenyl-1,2-propanedione-2-(O-ethoxycarbonyl)oxime, methyl O-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoyl peroxide, cumene hydroperoxide, 2-mercaptobenzimidazole, 2-mercaptobenzoxazole, 2-mercaptobenzothiazole, 2-(O-chlorophenyl)4,5-di(m-methoxyphenyl)imidazolyl dimers, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxvbenzophenone, benzyl, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, a,a-dichloro-4-phenoxyacetophenone, thioxanthone, 2-methylthioxanthone, 2-isopropylthioxanthone, dibenzosuberone, pentyl-4-dimethylamino benzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyflethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy)styrylphenyl-s-triazine, 2,4-bis-trichloromethyl-6-(2-bromo-4-methoxy)styrylphenyl-s-triazine, and the like. These photoinitiators may be used singly, or in a combination of two or more types thereof.

Examples of thermal polymerization initiators include organic peroxide such as ketone peroxide (methyl ethyl ketone peroxide, cyclohexanone peroxide, and the like), peroxy ketal(2,2-bis(tert-butylperoxy)butane, and 1,1-bis(tert-butylperoxy)cyclohexane, and the like), hydroperoxide (tert-butylhydroperoxide, cumene hydroperoxide, and the like), dialkyl peroxide (di-tert-butylperoxide (perbutyl (registered trademark) D (manufactured by NOF CORPORATION), and di-tert-hexyl peroxide(perhexyl (registered trademark) D (manufactured by NOF CORPORATION)), and the like), diacyl peroxide (isobutyryl peroxide, lauroyl peroxide, benzoyl peroxide, and the like), peroxydicarbonate (diisopropyl peroxydicarbonate and the like), peroxyester (tert-butylperoxy isobutylate, 2,5-dimethyl-2,5-di(benzoyl peroxy)hexane, and the like)); and azo compounds such as 1,1'-azobis(cyclohexane-1-carbonitrile), 2,2'-azobis isobutyronitrile, 2,2'-azobis(2,4-dimethyl-4-methoxyvaleronitrile), 2,2'-azobis(2-methylpropionamidine)dihydrochloride, 2,2'-azobis[2-methyl]-N-(2-propenyl)propionamideidihydrochloride, 2,2'-azobis(2-methylpropionamidine), 2,2'-azobis[2-methyl-N-(2-hydroxyethyl)propionamide], 2,2'-azobis(2-methyl propane), 2,2'-azobis(2,4,4-trimethyl pentane), dimethyl 2,2'-azobis(2-methyl propionate), and the like). These thermal polymerization initiators may be used singly, or in a combination of two or more types thereof.

The content of the initiator (D) with respect to 100 parts by mass of the component (A) is preferably 0.1 parts by mass or more and 20 parts by mass or less, more preferably 1 part by mass or more and 15 parts by mass or less, and even more preferably 3 parts by mass or more and 12 parts by mass or less. When the content of the initiator (D) falls within the numerical range, favorable antifogging properties tend to be achieved.

<Solvent (E)>

The curable composition according to the embodiment of the invention preferably contains a solvent (E) for the purpose of the adjustment of the application properties and viscosity thereof. The type of the solvent (E) is not particularly limited, and the solvent (E) is typically an organic solvent. The type of the organic solvent is not particularly limited so long as it can homogeneously dissolve or disperse the components contained in the curable composition.

Examples of the organic solvent include (poly)alkylene glycol monoalkyl ethers such as ethylene glycol monomethyl ether, ethylene glycol monoethyl ether, ethylene glycol n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as diethylene glycol dimethyl ether, diethylene glycol methylethyl ether, diethylene glycol diethyl ether, and tetrahydrofuran; ketones such as methyl ethyl ketone, cyclohexanone, 2-heptanone, and 3-heptanone; lactic acid alkyl esters such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoate, 3-methoxybutyl acetate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; amides such as N-methylpyrrolidone, N,N-dimethylformamide, and N,N-dimethylacetamide; and alcohols such as ethanol, isopropanol, butanol. These may be used singly, or in a combination of two or more types thereof.

The content of the solvent (E) is not particularly limited so long as it does not interfere with the purpose of the present invention. The solvent is used such that when the mass of the curable composition excluding the mass of the solvent (E) is referred to as solid components, the concentration of the solid components is preferably 0.1% by mass or more and 100% by mass or less, and more preferably 1% by mass or more and 50% by mass or less in light of film formability.

<Other Components>

The curable composition according to the embodiment of the invention may contain, in addition to the components described above, various additives that have been conventionally added to a curable composition, so long as they do not interfere with the purpose of the present invention. Preferred additives which may be added to the curable composition include a dispersing agent, an adhesion promoter such as a silane coupling agent, an antioxidant, an antiaggregation agent, a defoamer, and the like.

<Production Method of Curable Composition>

The curable composition is obtained by mixing the components described above in the respective predetermined amount, and thereafter homogeneously stirring the mixture.

<Applications of Curable Composition>

The curable composition according to the embodiment of the invention can form a cured product excellent in antifogging properties, and therefore suitably used for, for example, an antifogging coating agent. Examples of the applications of the antifogging coating agent are not particularly limited so long as the antifogging coating agent is applied to an article required to have antifogging properties, and examples of the article of the antifogging coating agent include glasses, protective eyewear, goggles, bathroom interior walls, kitchen components, glass and plastics used in headlamp covers and rear lamp covers of automobiles and motorcycles, and the like.

<<Cured Film>>

A cured film formed from the cured product of the curable composition described above exhibits excellent antifogging properties. The thickness of the cured film is not particularly limited, and is, for example, 0.1 µm or more and 100 µm or less, and preferably 1 µm or more and 50 µm or less. Examples of the applications of the cured film are the same as those for the antifogging coating agent.

EXAMPLES

Hereinafter, the present invention will be described in more detail by way of Examples, but the present invention is not limited to these Examples.

Various chemicals used in Examples and Comparative Examples are collectively described below.

<Component (A1)>

A-11: an acrylate compound represented by the following formula (sum of m: 60; n: 4; and HLB value: 16.11)

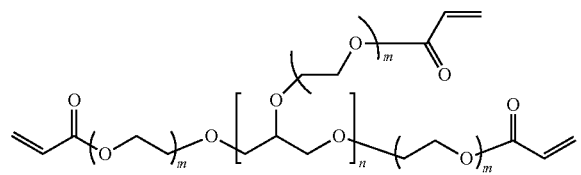

A-12: an acrylate compound represented by the following formula (HLB value: 16.60)

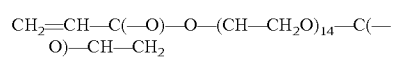

<Component (B)>
B-1: di-2-ethylhexyl-sulfosuccinate sodium salt (from Tokyo Chemical. Industry Co., Ltd.; cationic surfactant; a compound represented by the following formula)

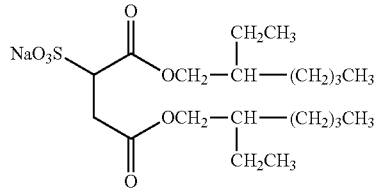

B-2: polyethylene glycol monooleyl ether (from Tokyo Chemical Industry Co., Ltd.; nonionic surfactant; a compound represented by the following formula (b) (n=ca. 2))
B-3: polyethylene glycol monooleyl ether (from Tokyo Chemical Industry Co., Ltd.; nonionic surfactant; a compound represented by the following formula (b) (n=ca. 7))
B-4: polyethylene glycol monooleyl ether (from Tokyo Chemical Industry Co., Ltd.; nonionic surfactant; a compound represented by the following formula (b) (n=ca. 10)) $C_{18}H_{35}(CH_2CH_2O)_nOH$ (b)
B-5: Surflon S-242 (from AGC Seimi Chemical Co., Ltd.; nonionic surfactant; active ingredient 100% by mass)
B-6: didecyldimethylammonium bromide (from Tokyo Chemical Industry Co., Ltd.; cationic surfactant)
<Component (A2)>
A-21: KAYARAD DPHA (from Nippon Kayaku Co., Ltd.; mixture of dipentaerythritol hexaacrylate (a=6, and b=0)/dipentaerythritol pentaacrylate (a=5, and b=1) each represented by the following formula; HLB value: 0.65 or less)

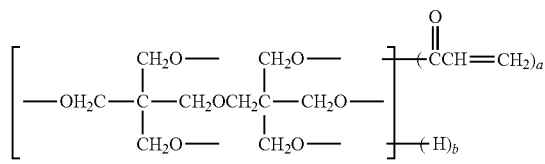

A-22: M-309 (from Toa Gosei Co., Ltd.; a compound represented by the following formula; trimethylolpropane triacrylate; HLB value: 0)

$(CH_2=CHCOOCH_2)_3-CCH_2CH_3$

A-23: an acrylate compound represented by the following formula (sum of m: 6; n: 4; and HLB value: 5.85)

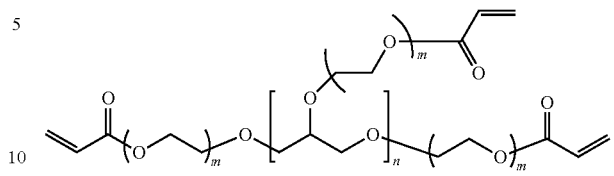

A-24: an acrylate compound represented by the following formula (HLE value: 15.17)

$CH_2=CH-C(=O)-O-(CH_2CH_2O)_9-C(=O)-CH=CH_2$

<Component (D)>
D-1: IRGACURE 651 (from IGM Resins; a compound represented by the following formula (wherein Ph represents a phenyl group))

$Ph-C(=O)-C(OCH_3)_2-Ph$

<Component (E)>
E-1: propylene glycol monomethyl ether (PGME)
E-2: isopropyl alcohol (IPA)

Examples and Comparative Examples

The chemicals of the type and amount specified in Tables 1 and 2 were homogeneously mixed, to obtain curable compositions according to Examples and Comparative Examples. Each of the curable compositions obtained was applied on a polycarbonate (PC) plate by spin coating, and heated at 80° C. for 5 minutes. Subsequently, the curable composition was exposed using an ultra-high-pressure mercury vapor lamp at a dose of 3,000 mJ/cm² to prepare a cured film having a film thickness of 5 μm. Each of the cured films obtained was evaluated for antifogging properties according to the following method. The results are shown in Tables 1 and 2.

(Antifogging Properties)
The surface of the substrate prepared above was wiped with a water-wetted cloth. Then, 50 mL of water at 50° C. was added to a 100 mL beaker, and the cured film prepared above was exposed to the water for 3 minutes at a distance of 5 cm from the water surface. The state of fogging of the cured film under this condition was visually evaluated according to the following criteria:
A: No fogging for 3 minutes or more
B: Fogging in less than 3 minutes

TABLE 1

|  | Examples | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| A-11 | 70 | 70 | 60 | 80 | 70 | 70 | 70 | 70 | 70 | 100 |  |
| A-12 |  |  |  |  |  |  |  |  |  |  | 90 |
| B-1 | 1 | 3 | 3 | 3 |  |  |  |  |  | 3 | 3 |
| B-2 |  |  |  |  | 1 |  |  |  |  |  |  |
| B-3 |  |  |  |  |  | 1 |  |  |  |  |  |
| B-4 |  |  |  |  |  |  | 1 |  |  |  |  |
| B-5 |  |  |  |  |  |  |  | 1 |  |  |  |
| B-6 |  |  |  |  |  |  |  |  | 1 |  |  |
| A-21 | 30 | 30 | 40 | 20 | 30 | 30 | 30 | 30 | 30 |  | 10 |
| A-22 |  |  |  |  |  |  |  |  |  |  |  |
| A-23 |  |  |  |  |  |  |  |  |  |  |  |
| A-24 |  |  |  |  |  |  |  |  |  |  |  |

TABLE 1-continued

|   | Examples | | | | | | | | | | |
|---|---|---|---|---|---|---|---|---|---|---|---|
|   | 1 | 2 | 3 | 4 | 5 | 6 | 7 | 8 | 9 | 10 | 11 |
| D-1 | 5 | 5 | 5 | 5 | 5 | 5 | 5 | 5 | 5 | 5 | 10 |
| E-1 | 112 | 102 | 102 | 102 | 116 | 116 | 116 | 116 | 112 | 102 | 97 |
| E-2 | 4 | 12 | 12 | 12 |   |   |   |   | 4 | 12 | 12 |
| E total | 116 | 114 | 114 | 114 | 116 | 116 | 116 | 116 | 116 | 114 | 109 |
| Antifogging properties | A | A | A | A | A | A | A | A | A | A | A |

TABLE 2

|   | Comparative Examples | | | |
|---|---|---|---|---|
|   | 1 | 2 | 3 | 4 |
| A-11 |   |   |   |   |
| A-12 |   |   |   |   |
| B-1 | 1 | 1 | 1 | 1 |
| B-2 |   |   |   |   |
| B-3 |   |   |   |   |
| B-4 |   |   |   |   |
| B-5 |   |   |   |   |
| B-6 |   |   |   |   |
| A-21 | 100 |   |   |   |
| A-22 |   | 100 |   |   |
| A-23 |   |   | 100 |   |
| A-24 |   |   |   | 100 |
| D-1 | 5 | 5 | 5 | 5 |
| E-1 | 112 | 112 | 112 | 112 |
| E-2 | 4 | 4 | 4 | 4 |
| E total | 116 | 116 | 116 | 116 |
| Antifogging properties | B | B | B | B |

As shown in Tables 1 and 2, it was found that the antifogging properties of Examples were favorable, while the antifogging properties of Comparative Examples were inferior. Thus, it was confirmed that the curable composition according to the embodiment of the invention provides a cured film excellent in antifogging properties.

What is claimed is:

1. A curable composition comprising a (meth)acrylate compound (A), and a surfactant (B),
   wherein the component (A) comprises a (meth)acrylate compound (A1) having an HLB value of 15.2 or more, wherein the HLB value is calculated according to the following formula: 20× (sum of formula weights of hydrophilic funcational groups)/(molecular weights), and
   a content of the component (B) with respect to 100 parts by mass of the component (A) is 0.1 parts by mass or more and 20 parts by mass or less.

2. The curable composition according to claim 1, wherein the component (A1) comprises a polyfunctional (meth)acrylate compound represented by formula (a1), and/or a bifunctional (meth)acrylate compound represented by formula (a2):

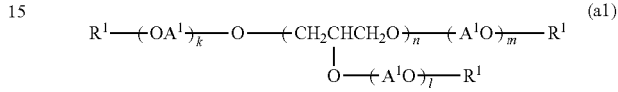

(a1)

wherein in the formula (a1), n is a number of 4 or more;
A1 represents independently at each occurrence an alkylene group having 2 or more and 4 or less carbon atoms;
k, l and m are a number of 0 or more, and a sum of k, l and m is 50 or more; and
$R^1$ represents independently at each occurrence a hydrogen atom or a (meth)acryloyl group, and at least three RI represent a (meth)acryloyl group, and

(a2)

wherein in the formula (a2), $A^2$ represents an alkylene group having 2 or more and 4 or less carbon atoms;
p is a number of 10 or more; and
$R^2$ represents independently at each occurrence a (meth) acryloyl group.

3. The curable composition according to claim 1, wherein the component (A) further comprises a polyfunctional (meth)acrylate compound (A2) other than the component (A1), and
   a content of the component (A2) in 100% by mass of the component (A) is 1% by mass or more and 65% by mass or less.

4. The curable composition according to claim 1, further comprising an initiator (D), wherein
   a content of the component (D) with respect to 100 parts by mass of the component (A) is 0.1 parts by mass or more and 20 parts by mass or less.

5. An antifogging coating agent comprising the curable composition according to claim 1.

6. A cured film formed from a cured product of the curable composition according to claim 1.

* * * * *